Sept. 12, 1950     E. C. WEISKOPF     2,522,416
HOLDER FOR MICROSCOPE SLIDES
Filed Aug. 21, 1947     2 Sheets-Sheet 1
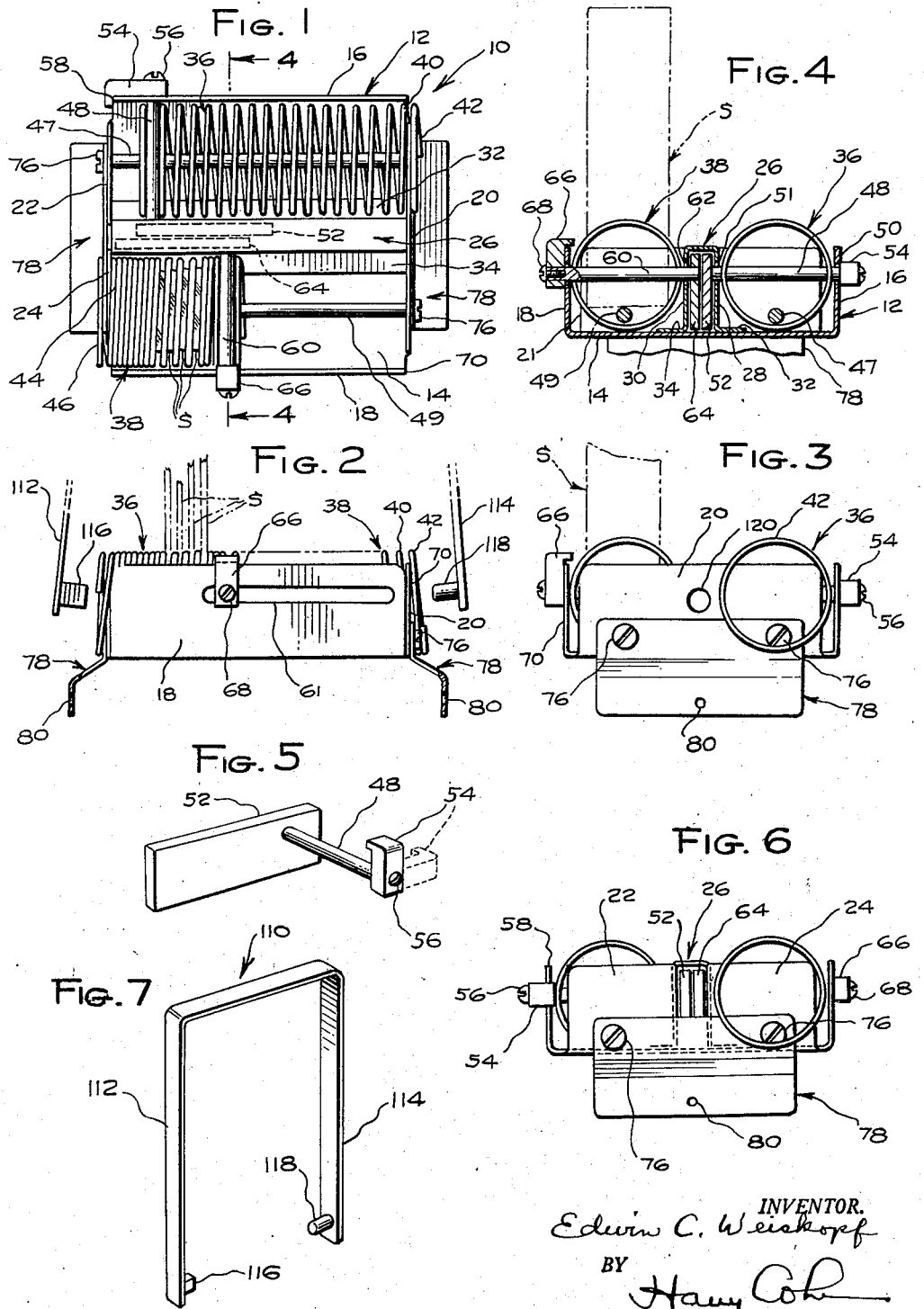

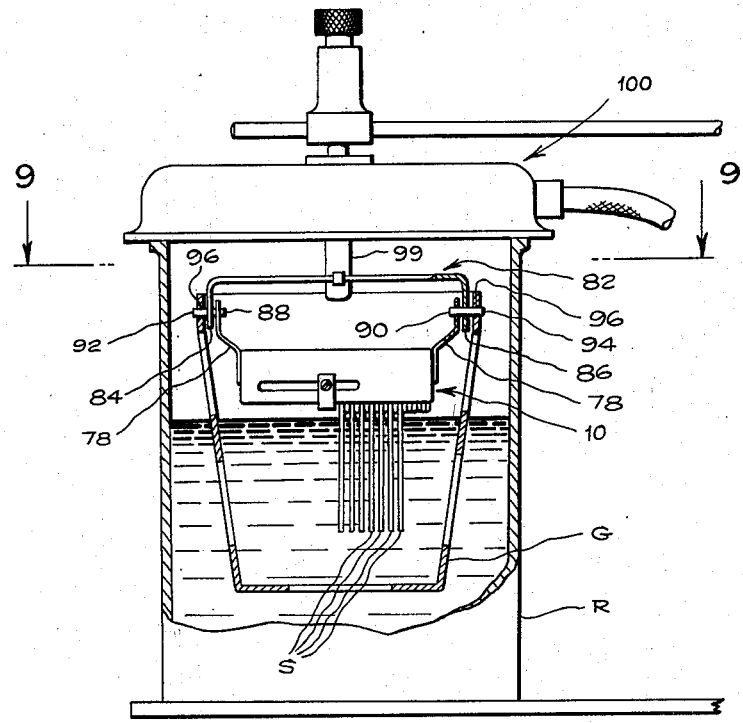
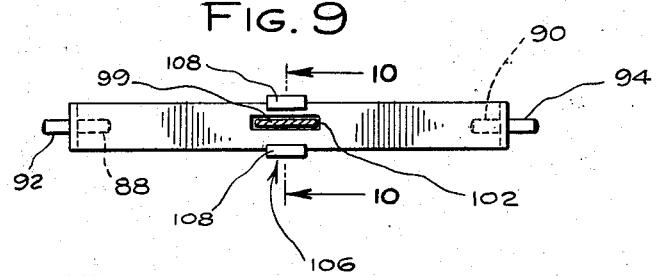
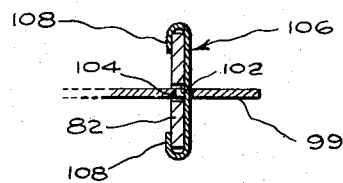

Patented Sept. 12, 1950

2,522,416

UNITED STATES PATENT OFFICE 2,522,416

HOLDER FOR MICROSCOPE SLIDES

Edwin Carl Weiskopf, New York, N. Y.

Application August 21, 1947, Serial No. 769,897

15 Claims. (Cl. 91—60)

My present invention relates to holders for microscope slides, usually referred to as microslides.

The primary object of the present invention is the provision of a micro-slide holder which is particularly well adapted for use in automatic immersion apparatus, such as that shown for example in my United States Letters Patent No. 2,341,198, for staining the specimens carried by the slides.

In staining slides, a thin section of wax-impregnated tissue is mounted on a glass microscope slide which is thereafter immersed successively in a plurality of different liquids including a solvent for the wax, in order to remove the latter from the tissue specimen, and including a plurality of liquids for staining the tissue. The slide holder of the present invention enables a comparatively large number of slides to be treated simultaneously for staining them, and enables this treatment to be performed automatically in my above mentioned automatic immersion apparatus. In this connection it will be understood that when the slide holder of the present invention is attached to the automatic immersion apparatus, the slides carried by said slide holder are automatically immersed in succession and for predetermined periods of time in a plurality of the liquids necessary for carrying out the staining process.

The above and other objects, features and advantages of the invention will be fully understood from the following description considered in connection with the accompanying illustrative drawings.

In the drawings:

Fig. 1 is a plan view of a micro-slide holder or rack embodying my present invention;

Fig. 2 is a side view of the slide holder, showing also parts of a detachable handle provided therefor;

Fig. 3 is an end view of the slide holder;

Fig. 4 is a sectional view on the line 4—4 of Fig. 1;

Fig. 5 is a detail perspective view of a part of the slide holder;

Fig. 6 is an end view of the slide holder, at its end which is opposite to the end shown in Fig. 3;

Fig. 7 is a perspective view of the auxiliary or temporary handle for the slide holder;

Fig. 8 is a view partly in elevation and partly in section showing the slide holder associated with an operating part of the above mentioned automatic immersion apparatus;

Fig. 9 is a sectional view on the line 9—9 of Fig. 8, the slide holder and guard member not being shown;

Fig. 10 is a sectional view on the line 10—10 of Fig. 9.

Referring now to the drawings in detail, the slide holder 10 embodying the present invention comprises a frame 12 having a wall 14, laterally spaced sides 16 and 18 upstanding from wall 14, end wall 20 at one end of the frame, and end wall parts 22 and 24 at the opposite end of said frame. As thus far described, said frame is preferably formed in one piece from suitable sheet material. A longitudinally extending partition member 26 is secured in the frame midway between the sides 16 and 18, and extends for the full length of the frame dividing the latter into two laterally disposed compartments. As here shown, partition member 26 is channel shaped having the laterally spaced sides 28 and 30, provided with bent lower ends 32 and 34, respectively, which are spot welded or otherwise secured to wall 14 of frame 12.

A helically coiled spring 36 is disposed in the frame compartment which is defined by side 16 and the confronting side 28 of partition member 26, and a similar helically coiled spring 38 is disposed in the frame compartment defined by side 18 of the frame and the confronting side 30 of said partition member. Each of these springs in its contracted condition is shorter in length than the companion frame compartment, as shown for example with reference to the spring 38 in Fig. 1, whereby the spring is resiliently movable from an axially contracted condition to an axially expanded condition. As shown in Fig. 1, spring 36 is in its axially expanded condition, and it will be understood that spring 38 is similarly resiliently movable to an axially expanded condition. One end of each spring is anchored to an adjacent end part of the frame, preferably as here shown, by disposing the spring with its adjacent end convolutions at the anchored end of the spring at opposite sides of the adjacent end part of the frame. Thus, as shown in the drawings the adjacent end convolutions 40 and 42 of spring 36 are disposed at opposite sides, respectively, of end part 20 of the frame, and the adjacent end convolutions 44 and 46 of the anchored end of spring 38 are disposed at opposite sides respectively of the adjacent end part 24 of the frame. Rods 47 and 49 which are secured to the frame near wall 14, as hereafter more particularly described, are disposed within the springs, as shown in Figs. 1 and 4, and prevent displacement of the springs laterally thereof and laterally of the compartments through the openings thereof. It will be observed that when the slide holder is inverted as shown in Fig. 8, rods 47 and 49 prevent buckling or downward movement or flexing of the spring which might otherwise occur due to the weight of the slides.

It will be understood that when the springs are expanded so that the adjacent convolutions are spaced from each other, as illustrated in Fig. 1, with reference to spring 36, the insertion of micro-slides in position between adjacent spring convolutions is facilitated, and that when the spring is released from its expanded condition the slides are resiliently gripped by, and thereby held between, the adjacent spring convolutions. Thus, as shown in Fig. 1, the micro-slides S are positioned between adjacent companion spring convolutions and are thus resiliently secured and held in position in the frame. It will be understood that although only a few micro-slides have been shown, the construction and arrangement is such that a slide may be mounted between each two adjacent convolutions of each spring, whereby the slide holder has a desirably large slide holding capacity. The springs have a low pitch so that the slides are positioned substantially at right angles to the parallel sides 16 and 18 of the frame, and parallel to the opposite end parts 20 and 22, 24 of the frame.

Provision is made for releasably holding the springs 36 and 38 in the expanded conditions respectively, thereof. For this purpose, referring first to spring 36, a cross member or pin 48 is disposed in position between adjacent convolutions of spring 36 at the end thereof which is opposite to the anchored end of said spring. Member 48 is movable longitudinally of the frame holder and is guided for said movement by longitudinally extending guide slots 50 and 51 provided in side 16 and the confronting side 28 of partition member 26. Member 48 projects through said guide slots, and one end of said member is fastened to a guide plate 52 (Fig. 5) which is positioned within the channel of partition member 26 in slidable engagement with the inner surface of side 28 of the partition member. The outer end of member 48 which projects through guide slot 50 has a catch 54 pivotally mounted thereon and releasably secured thereto in any suitable way as by a screw 56. As shown in Fig. 1, when the spring is in its expanded condition, catch 54 is engaged with the frame for releasably holding the spring in said expanded condition, said catch engaging the adjacent edge 58 of side 16 of the frame. A device of the same construction is provided for releasably holding the spring 38 in its expanded condition. Thus, as here shown a cross member 60 is disposed between the adjacent end convolutions of spring 38 at the end thereof opposite the anchored end of the spring and rides in the guide slots 61 and 62 provided in the frame side 18 and in the side 30 of the partition member 26. The retaining plate 64 for member 60 is similarly disposed within the channel of the partition member adjacent plate 52 in side by side relation with the latter, as shown in Fig. 4. The releasable catch 66 is pivotally secured at the outer end of cross member 60 by the screw 68 and is releasably engageable with the edge 70 of the side 18 of the frame. Fig. 5 shows the cross member 48, its guide plate 52 and the pivoted catch 54, but it will be understood that since cross member 60, its guide plate 64 and catch 66 are of the same construction as the parts shown in Fig. 5, the latter may be considered as illustrative of each of these devices.

End part 20 of the frame is rigidly secured to end parts 22 and 24 by the above mentioned rods 47 and 49, respectively. It will be understood that each of said rods is shouldered at its opposite ends so that end parts 20 and 22 are held against movement toward each other and so that said end part 20 and end part 24 are similarly held against movement toward each other. The reduced end portions of said rods 72 and 74 pass through openings in the adjacent end parts of the frame and are fastened to said end parts, respectively, in any suitable way as by screws 76. These screws 76 also serve to fasten the bracket arms 78 to the opposite end of the frame. These bracket arms are formed of spring metal and are each provided with an aperture 80 for releasably attaching the slide holder to bracket member 82 (Fig. 8) by which the slide holder is attached to the companion part of the automatic immersion apparatus such as that shown in my above mentioned Patent No. 2,341,198.

Bracket member 82 is in the form of a rigid metal strap having confronting end portions 84 and 86 which are provided with lateral pin projections 88 and 90, respectively, for releasably engaging bracket arms 78 in the openings 80 thereof, whereby to support the slide holder in the inverted position shown in Fig. 8 so that the slides carried by the slide holder may be immersed in the liquid provided in the receptacle R of the immersion apparatus, as indicated in Fig. 8. Said bracket member 82 is also provided with lateral projections 92 and 94 which extend from the outer sides of the bent end portions 84 and 86 and are engageable in companion holes 96 provided at diametrically opposite points in the perforated basket or guard G for supporting the latter as a unit with the slide holder, as shown in Fig. 8. Bracket member 82 is attached to the rotary shaft 99 of the device 100 which is the same as the device 100 of the immersion apparatus shown in said patent. Bracket member 82 is attached to the lower end of shaft 99, as shown in Fig. 8 and for that purpose bracket member 82 is provided with a non-circular slot 102 (Fig. 9) through which a non-circular part of shaft 99 projects. Said shaft is provided with an opening 104 through which a pliable metal strip 106 is passed and bent at its ends over member 82 as indicated at 108.

An auxiliary handle 110 (Fig. 7) is provided as a convenient means for carrying the slide holder 10 when said slide holder is positioned with the open side of the frame uppermost as shown in Fig. 2. For example, after the slides are stained and the slide holder carrying said slides is removed from the automatic immersion apparatus said slide holder is placed on a suitable support in horizontal position with the open side of the frame uppermost as shown in Fig. 2. Handle 110 may then be attached to the slide holder for placing the latter in a receptacle containing a suitable liquid in accordance with any usual method of preparing slides, to protect the tissue specimens until the preparation of the slide is completed and the cover glass is attached. The handle 110 comprises the U-shaped member having the arms 112 and 114 which are provided with the inwardly projecting members 116 and 118 respectively for engagement with the frame 12 of the slide holder. For this purpose the end part 20 of the slide holder is provided with an opening 120, in alignment with the channel of member 26, to receive pin 118, and at the opposite end of the slide holder the projection 116 which is non-circular is received in the space between end parts 22, 24 and in the channel of the partition member 26. Handle 110 is preferably formed of spring metal and arms 112 and 114 are biased to a somewhat converging relation so as to automatically retain the engagement of pins 116 and 118 releasably with the frame 12 of the slide holder, it being understood that said arms 112 and 114 of the handle may be sprung apart sufficiently to enable the handle to be attached to and removed from the slide holder.

It will be understood that while the slide holder is intended primarily for use in connection with the staining of slides and is well adapted for that purpose, for use in automatic immersion apparatus, said slide holder may be used generally for holding slides and that the invention may be embodied in means for holding slides in a slide cabinet for example, for filing or storage purposes as described for example in my co-pending application Serial No. 730,832. Also it will be understood that while I have shown the slide holder provided with two compartments, said slide holder may have only one compartment and one companion slide-holding spring or more than two compartments and a corresponding number of companion slide-holding springs.

Finally, it will be understood that various changes in the details of construction and in the arrangement of parts may be made in the slide holder embodying the present invention without departing from the underlying idea or principles thereof within the scope of the appended claims.

Having thus described my invention, what I claim and desire to secure by Letters Patent, is:

1. A device for holding a plurality of microslides, comprising a frame, a helically coiled spring mounted in said frame and supported therein substantially throughout the length of the spring for movement from an axially contracted condition to an axially expanded condition to facilitate the insertion of slides between adjacent spring convolutions, and means engaging said spring and said frame for positively moving said spring to said expanded condition and for releasably holding said spring in said axially expanded condition thereof, said means moving in a planar direction from the disposition thereof in said axially contracted condition of said spring to the disposition thereof in which said means releasably holds said spring in said axially expanded condition, the major longitudinally extending portion of said spring being clear of said spring-moving means and the spaces between the spring convolutions in said major portion of the spring being clear of obstructions substantially throughout the areas of said spaces transversely of the spring axis.

2. A device for holding a plurality of microslides, comprising a frame, a helically coiled spring mounted in said frame for movement from an axially contracted condition to an axially expanded condition to facilitate the insertion of slides between adjacent spring convolutions, and a catch connected to said spring and releasably engageable with said frame for releasably holding said spring in said axially expanded condition thereof, said catch moving in a planar direction from the disposition thereof in said axially contracted condition of said spring to the disposition thereof in which said catch releasably engages said frame for releasably holding said spring in said axially expanded condition.

3. A device for holding a plurality of microslides, comprising a frame, a helically coiled spring mounted in said frame for movement from an axially contracted condition to an axially expanded condition to facilitate the insertion of slides between adjacent spring convolutions, one end of said spring being anchored to a part of said frame, the other end of said spring being freely movable between the respective positions of said spring in said axially contracted and said axially expanded conditions thereof, and means for connecting said other end of said spring releasably to another part of said frame at a point longitudinally spaced from said first mentioned part for releasably holding said spring in said expanded condition thereof.

4. A device for holding a plurality of microslides, comprising a frame, a helically coiled spring mounted in said frame for movement from an axially contracted condition to an axially expanded condition to facilitate the insertion of slides between adjacent spring convolutions, and means engaging said spring and said frame for positively moving said spring to said expanded condition and for releasably holding said spring in said expanded condition thereof, said means having a part connected to said spring and movable in the direction of the spring axis to the position in which said means releasably holds said spring in said expanded condition thereof, and said frame having a guide for said means.

5. A device for holding a plurality of microslides, comprising a frame, a helically coiled spring mounted in said frame for movement from an axially contracted condition to an axially expanded condition to facilitate the insertion of slides between adjacent spring convolutions, said spring being anchored at one end thereof to said frame, means engaging said spring at a point spaced from said anchored end thereof for expanding said spring, said frame having a longitudinal guide and said means being movable in said guide, and a part in operative engagement with said means and releasably engageable with said frame for releasably holding said spring in said expanded condition thereof.

6. A device for holding a plurality of microslides, comprising a frame, a helically coiled spring mounted in said frame for movement from an axially contracted condition to an axially expanded condition to facilitate the insertion of slides between adjacent spring convolutions, said spring being anchored at one end thereof to said frame, means engaging said spring at a point spaced from said anchored end thereof for expanding said spring, said frame having a longitudinal guide and said means being movable in said guide, and a catch carried by said means and releasably engageable with said frame for releasably holding said spring in said expanded condition thereof.

7. A device for holding a plurality of microslides, comprising a frame, a helically coiled spring mounted in said frame and supported therein substantially throughout the length of the spring for releasably holding the micro-slides in position between adjacent spring convolutions, respectively, said frame being sufficiently open at one side thereof for the insertion of the body portion of the slides and for the removal of the slides, and means for supporting said frame in horizontal position so that the slides project vertically from said spring outwardly through said open side of the frame, the interior of said spring being substantially clear of obstructions so that slides inserted between adjacent convolutions of the spring are gripped at their opposite sides, respectively, by substantially the entire peripherally extending portions of said adjacent spring convolutions, respectively.

8. A device for holding a plurality of microslides, comprising a frame, a helically coiled spring mounted in said frame for movement from an axially contracted condition to an axially expanded condition to facilitate the insertion of slides between adjacent spring convolutions, said frame having laterally spaced longitudinally extending parts between which said spring is positioned with the axis of said spring extending longitudinally of said parts, said parts having longitudinally extending guide means, and a member extending transversely of the spring between adjacent convolutions thereof and engaging said guide means, said spring being anchored to said frame at a point spaced from said adjacent convolutions whereby said spring is expanded and contracted in the movement of said member away from and toward said point, respectively.

9. A device for holding a plurality of microslides, comprising a frame, a helically coiled spring mounted in said frame for movement from an axially contracted condition to an axially expanded condition to facilitate the insertion of slides between adjacent spring convolutions, said frame having laterally spaced longitudinally extending parts between which said spring is positioned with the axis of said spring extending longitudinally of said parts, said parts having longitudinally extending guide means, and a member extending transversely of the spring between adjacent convolutions thereof and engaging said guide means, said spring being anchored to said frame at a point spaced from said adjacent convolutions whereby said spring is expanded and contracted in the movement of said member away from and toward said point, respectively, and a catch pivotally mounted on said member and releasably engageable with said frame for releasably holding said spring in its expanded condition.

10. A device for holding a plurality of microslides, comprising a frame, a helically coiled spring mounted in said frame for movement from an axially contracted condition to an axially expanded condition to facilitate the insertion of slides between adjacent spring convolutions, said frame having an opening for the insertion in and the removal of the slides from the spring, and means carried by said frame and disposed internally of the spring convolutions and laterally beyond the spring axis away from said opening to hold the spring in place without obstructing the spaces between spring convolutions, said frame having sides between which said opening is located and which extend longitudinally of the spring and are positioned adjacent the opposite sides respectively of the latter for limiting movement of the slides laterally of the longitudinal axis of the spring.

11. A device for holding a plurality of microslides, comprising a frame, a helically coiled spring mounted in said frame for movement from an axially contracted condition to an axially expanded condition to facilitate the insertion of slides between adjacent spring convolutions, said frame having an opening for the insertion in and the removal of the slides from the spring, and means disposed internally of the spring and connected to said frame to hold the spring in place, said spring being resiliently expansible and contractable in relation to said last mentioned means.

12. A device for holding a plurality of microslides, comprising a frame, a helically coiled spring mounted in said frame for movement from an axially contracted condition to an axially expanded condition to facilitate the insertion of slides between adjacent spring convolutions, said frame being in the form of a receptacle provided with an opening for the insertion in and the removal of the slides from the spring, and a rod secured in said frame and disposed internally of the spring and extending longitudinally thereof near its inner surface remote from said opening to hold the spring in place, said spring being resiliently expansible and contractable in relation to said rod.

13. A device for holding a plurality of microslides, comprising a frame, a helically coiled spring mounted in said frame for movement from an axially contracted condition to an axially expanded condition to facilitate the insertion of slides between adjacent spring convolutions, said frame having an opening for the insertion in and the removal of the slides from the spring, and a rod secured in said frame and disposed internally of the spring and extending longitudinally thereof near its inner surface remote from said opening to hold the spring in place, said spring being resiliently expansible and contractable in relation to said rod.

14. A slide-holder comprising a frame having laterally spaced longitudinally extending parts, a longitudinally extending partition member secured to said frame substantially midway between said parts for forming two laterally disposed compartments within said frame, said parts and said partition member having longitudinally extending guide means, a helically coiled spring mounted in each of said compartments for movement from an axially contracted condition to an axially expanded condition to facilitate the insertion of slides between adjacent spring convolutions, the axis of each of said springs extending longitudinally of said frame parts, and separate means engaging each of said springs and said frame for separately positively moving each spring to said expanded condition and for releasably holding each spring in said expanded condition thereof, each of said separate means engaging the guide means of said partition member and the guide means of one of said longitudinally extending parts.

15. In combination, a slide-holder comprising a frame having laterally spaced longitudinally extending parts, a longitudinally extending partition member secured to said frame substantially midway between said parts for forming two laterally disposed compartments within said frame, said partition member having dissimilar apertures at each end thereof, a helically coiled spring mounted in each of said compartments for movement from an axially contracted condition to an axially expanded condition to facilitate the insertion of slides between adjacent spring convolutions, the axis of each of said springs extending longitudinally of said frame parts, and carrier means for said slide-holder, said means comprising a generally U-shaped carrying member provided with pin members carried at each of its ends, said pin members being dissimilarly shaped to be releasably insertable within said dissimilar apertures whereby said slide-holder is portable in a predetermined position.

EDWIN CARL WEISKOPF.

REFERENCES CITED

The following references are of record in the file of this patent:

UNITED STATES PATENTS

| Number | Name | Date |
| --- | --- | --- |
| D. 25,926 | Elliston | Aug. 11, 1896 |
| 312,742 | Meinhard | Feb. 24, 1885 |
| 350,987 | Millard | Oct. 19, 1886 |
| 439,210 | Thome | Oct. 28, 1890 |
| 548,767 | Vuillier | Oct. 29, 1895 |
| 1,229,428 | Fabritius | June 12, 1917 |
| 1,747,681 | Schimmel | Feb. 18, 1930 |
| 1,780,061 | Bluff | Oct. 28, 1930 |
| 2,058,128 | Brubach | Oct. 20, 1936 |
| 2,341,198 | Weiskopf | Feb. 8, 1944 |